United States Patent [19]

Chen

[11] Patent Number: 5,130,502
[45] Date of Patent: Jul. 14, 1992

[54] VACUUM-CONTROLLED SWITCH MEANS RESPONSIVE TO ENGINE LOAD

[76] Inventor: Teh-Chih Chen, P. O. Box 67, Tounan (63004), Taiwan

[21] Appl. No.: 602,428

[22] Filed: Oct. 22, 1990

[51] Int. Cl.⁵ .............................................. H01H 35/34
[52] U.S. Cl. ................... 200/81.4; 123/389; 200/835; 200/294
[58] Field of Search ............ 307/118; 123/25 J, 25 L, 123/25 Q, 325, 339, 389, DIG. 11; 361/283; 362/95, 96; 92/103 M; 340/467, 626; 73/717, 715, 718, 723, 724; 200/81 R, 83 R, 83 A, 83 W, 83 S, 83 SA, 83 J, 81.4, 293, 294

[56] References Cited

U.S. PATENT DOCUMENTS

| | | | |
|---|---|---|---|
| 3,946,174 | 3/1976 | Herbst | 200/81.4 |
| 4,445,341 | 5/1984 | Hayashi | 62/133 |
| 4,900,883 | 2/1990 | Brame | 200/83 S |
| 4,951,810 | 8/1990 | Everett | 200/83 A |

Primary Examiner—Gerald P. Tolin

[57] ABSTRACT

A vehicle switch means includes an electric switch operatively closed or opened as driven by a central spindle controlled by a vacuum controller communicated with an inlet manifold of a car engine, whereby when the car is subject to a heavy load, the weak vacuum suction force in the inlet manifold will not suck a diaphragm in the vacuum controller and the spindle will be resiliently restored outwardly to switch off the electric switch to stop the running of compressor of a car air conditioner, thereby reducing the car engine load and being helpful for climbing a steep surface.

7 Claims, 5 Drawing Sheets

VACUUM-CONTROLLED SWITCH MEANS RESPONSIVE TO ENGINE LOAD

BACKGROUND OF THE INVENTION

When a car is carrying a heavy load or climbing a steep sloping surface, it will require a greater horse power for driving the engine. However, when the car is air conditioned, the car engine will also be subject to a load for driving a compressor of the air conditioner built in the car, causing a slow-down of the car running even deeply treadling the accelerator pedal, especially for a small car with lower horse power.

The recently developed high-class car may even be provided with computer-controlled switch which will be actuated to stop the compressor running of a car air conditioner when subject to a heavy engine load. However, such a computer-controlled switch is quite expensive and not feasible popularly.

The present inventor has found the drawbacks of the conventional car and invented the present vacuum-controlled switch means.

SUMMARY OF THE INVENTION

The object of the present invention is to provide a switch means including an electric switch operatively closed or opened as driven by a central spindle controlled by a vacuum controller communicated with an inlet manifold of a car engine, whereby when the car is subject to a heavy load, the weak vacuum suction force in the inlet manifold will not suck a diaphragm in the vacuum controller and the spindle will be resiliently restored outwardly to switch off the electric switch to stop the running of compressor of a car air conditioner, thereby reducing the car engine load and being helpful for climbing a steep surface.

DETAILED DESCRIPTION

Figure 1:
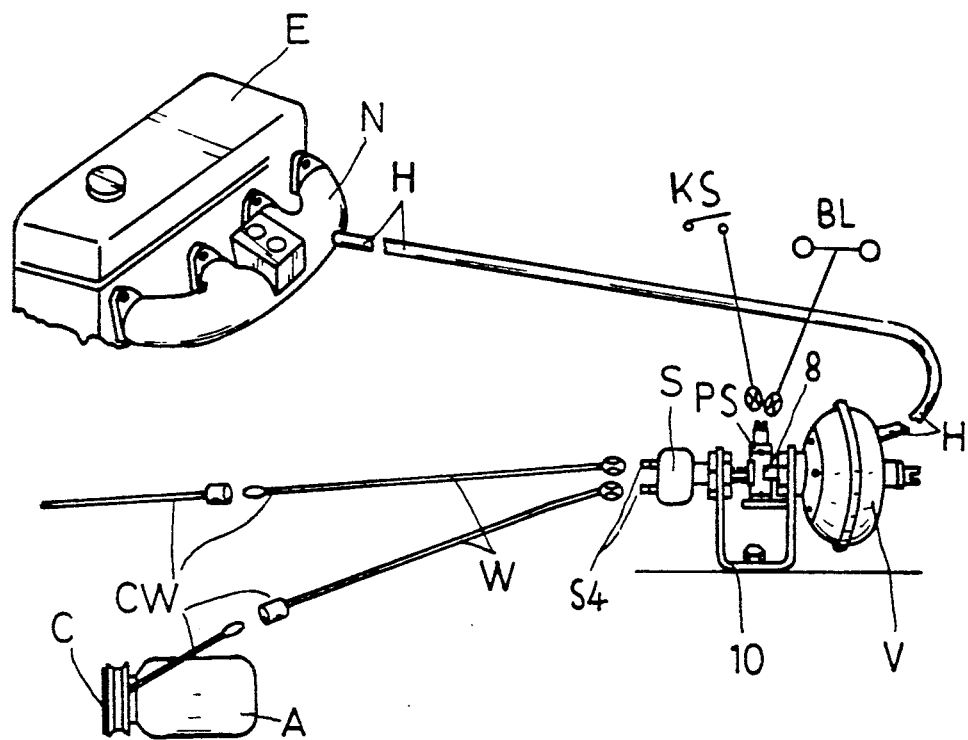
FIG. 1 is an illustration showing an overall system of the present invention.

As shown in FIG. 1, the present invention comprises: a vacuum controller V connected to an inlet manifold N of a car engine E by rubber hose H, and an electric switch S of power source electrically connected by two wires W to two electric wires CW connected to an electrically-operated clutch C of a compressor A of a car air conditioner. Both vacuum controller V and electric switch S are mounted on a car body by bracket 10. An additional photo-electric switch PS is provided between the controller V and switch S for controlling other devices in the car, such as for on-off control of a brake indicator lamp built on a car.

Figure 2:
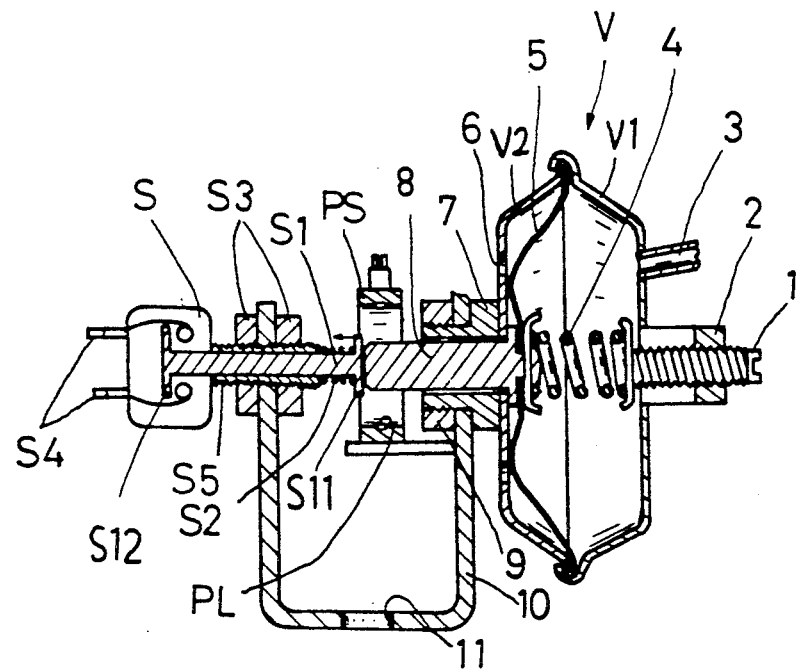
FIG. 2 is a sectional drawing of the present invention.

As shown in FIG. 2, the vacuum controller V of the present invention includes: a diaphragm 5 formed in a central portion in a controller housing which is formed by combining a right half disc V1 and a left half disc V2, a restoring spring 4 normally resiliently urging the diaphragm leftwardly, an adapter 3 formed on the right half disc V1 for fixing the hose H thereon to communicate the engine manifold N, an adjusting screw 1 adjustably mounted on the right disc V1 by a nut 2, a central spindle 8 mounted on a central portion of the diaphragm 5 protruding leftwardly through a central hole formed in the left disc and slidably held in a sleeve 7 secured with the left disc V2 mounted on the bracket 20 by nut 9, and a venting hole 6 formed in the left disc V2 for air intake and release purpose. The bracket 10 is mounted on a car body by bolt (not shown) through a bolt hole 11 formed in the bracket 10. The adjusting screw 1 is provided for adjusting an elastic force of the restoring spring 4.

The electric switch S for controlling the power source led to the clutch C of compressor A includes: a switch spindle S1 slidably held in a switch sleeve S5 mounted on the bracket 10 by nut S3, a tensioning spring S2 retained between a spindle head S11 and the sleeve S5 normally urging the switch spindle S1 rightwardly to allow a rear conductor plate S12 of the spindle S1 electrically contacting two contactors S4 of the switch S for switching on a power source. The nuts S3 may also be used for laterally adjusting the spindle S1 in the sleeve S5.

An additional photo-electric switch PS is mounted on the bracket 10 between the electric switch S and the vacuum controller V for optically conducting or disconnecting a photocell PL actuated by a light beam projecting through a space when not shielded by the spindle 8 leaving the spindle S1, for instance, for on-off control of the other electric devices built in a car such as for switching on or off a brake indicator lamp BL electrically connected to an engine switch KS as shown in FIG. 1.

Figure 3:
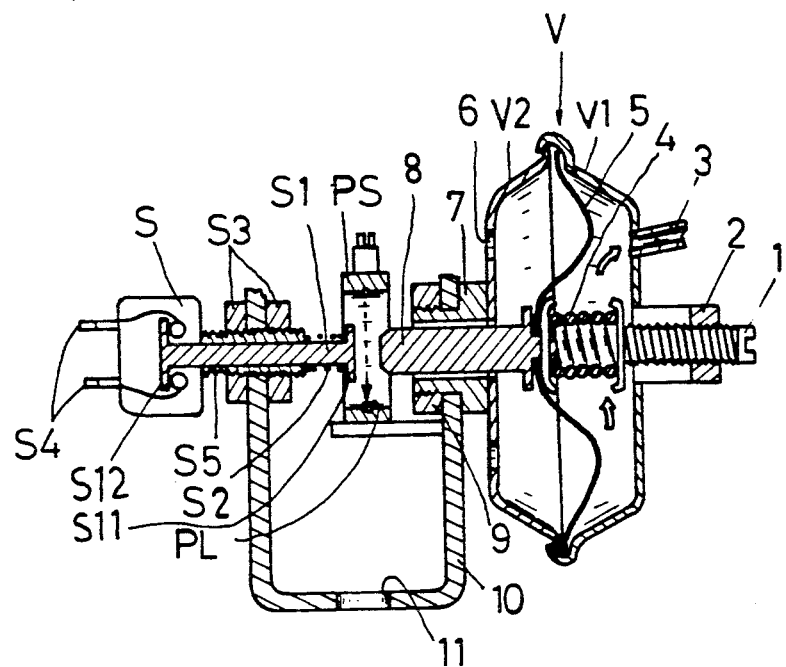
FIG. 3 is an illustration showing a situation with slow speed running in accordance with the present invention.

As shown in FIG. 3 when the car engine is running at slow speed or when releasing the accelerator pedal for slow-down or braking of a car during driving the car, the vacuum degree and the suction force in the inlet manifold N will be the greatest to suck the diaphragm 5 rightwardly and to withdraw the central spindle 8 rightwardly so as to leave from the switch spindle S1. The tensioning spring S2 still urges the switch spindle S1 rightwardly to conduct the two contactors S4 to continuously supply power for driving the conditioner compressor A. At this time, the central spindle 8 is separated from the switch spindle S1 without shielding a light beam transmitted from the photoelectric switch PS. The photocell PL will receive the light beam for switching on the other electric devices such as for lighting a brake indicator lamp BL which will give warning to the rear cars in advance.

Figure 4:
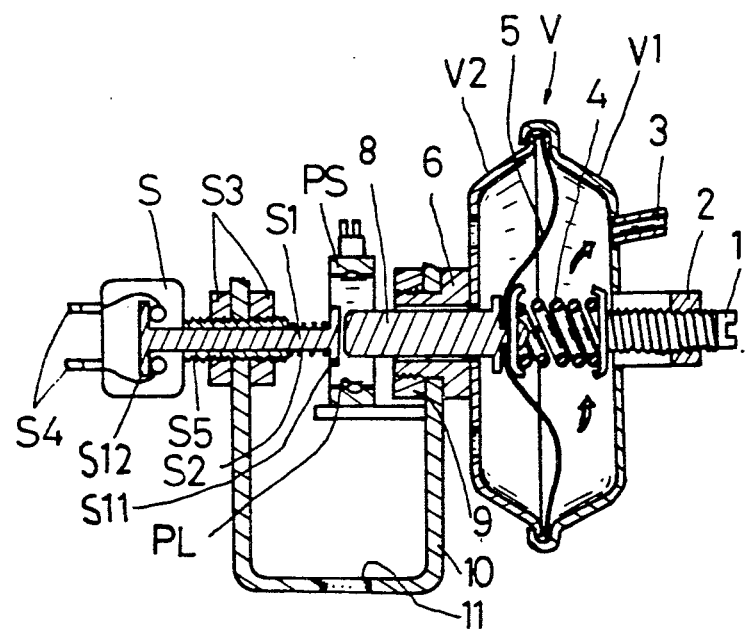
FIG. 4 shows the present invention at normal running speed.

As shown in FIG. 4, the car is running at normal speed and the car driver may treadle the accelerator about one fourth or two third of its full strike so that the car engine is subject to low or medium load and the vacuum suction force in the manifold N becomes medium between the strongest and the weakest to slightly suck the diaphragm 5 rightwardly to slightly separate the central spindle 8 from the switch spindle S1, still closing the switch S for continuous power supply for driving the air conditioner, but interrupting the light beam to the photocell PL to switch off the brake lamp BL.

Figure 5:
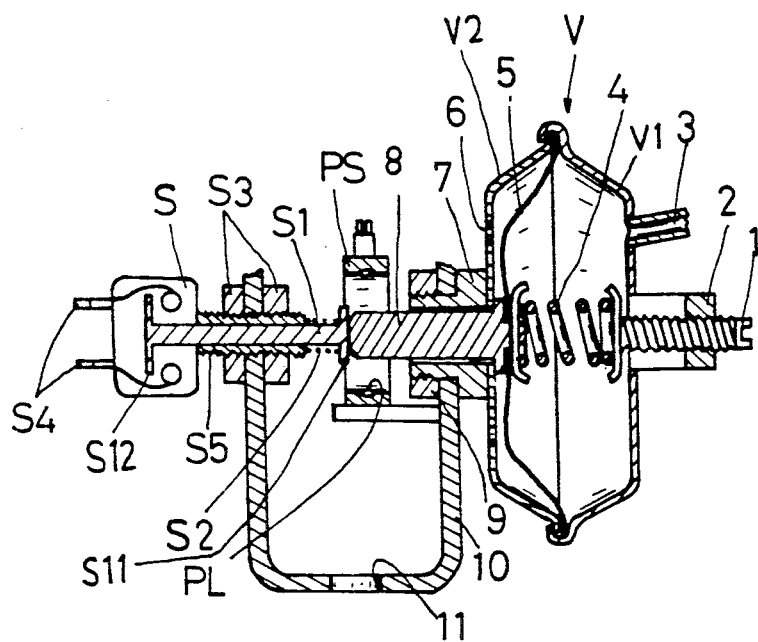
FIG. 5 shows the present invention at high-load running.

When it is intended to climb a steep surface or to start engine running under heavy load as shown in FIG. 5, an accelerator pedal will be trodden deeply to supply more fuel into the engine in order to increase the horse power for driving the car, thereby weakening the vacuum suction force in the inlet manifold N. Therefore, the diaphragm 5 will not be sucked rightwardly and the restoring spring 4 always restores the diaphragm 5 leftwardly to protrude the central spindle 8 leftwardly to push the switch spindle S1 leftwardly, separating the conductor plate S12 from the two contactors S4 and switching off the electric switch S for stopping the compressor running of the air conditioner. The engine will use its full horse power for quickly climbing the steep surface or for exceeding a front car, also for saving fuel, reducing air pollution and enhancing traffic safety. At this time (FIG. 5), the photo electric switch PS is still not actuated as the light beam is interrupted by the spindle 8 so that the brake lamp may not be lit.

The engine running subject to high load as shown in FIG. 5 must be adjusted to slightly slow down the car running. Otherwise, the car will rush at a very high speed to easily cause an accident. Once the accelerator is slightly released, the vacuum suction force in the manifold N will become stronger to suck the diaphragm 5 and slightly move the central spindle 8 rightwardly as shown in FIG. 4. The contactors S4 are now conducted for re-starting the compressor running for the air conditioner, thereby providing a comfortable air-conditioned environment at suitable temperature in the car.

Figure 6:
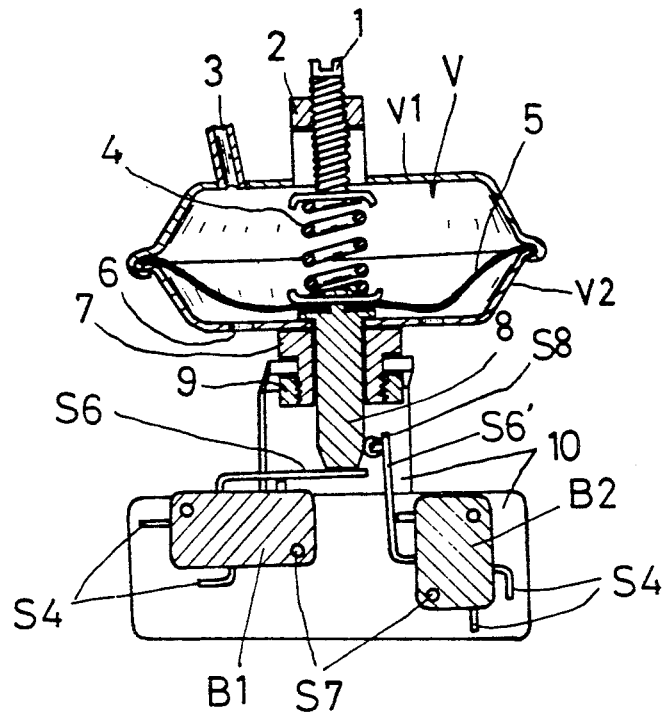
FIG. 6 shows another preferred embodiment of the present invention.

Another preferred embodiment of the present invention is shown in FIG. 6, in which two sets of micro-switch B1, B2 are provided to substitute the aforementioned electric switch S and photo-electric switch PS. Both switches B1, B2 are mounted on the bracket 10 by fixing screws through holes S7 formed in each switch. The first micro-switch B1 which is normally closed includes a resilient actuating lever S6 for operatively depressing a button of the switch B1 for switching off a power source supplied to the conditioner compressor. The second microswitch B2 which may be normally closed and operatively depressed to disconnect a power supply includes a resilient actuating lever S6' for operatively depressing a button of the switch B2 such as for switching off the power supply to the brake indicator lamp BL. At an outermost end of the lever S6', there is rotatably mounted with a roller S8 to be rollingly depressed by a cylindrical surface of the central spindle 8.

Figure 7:
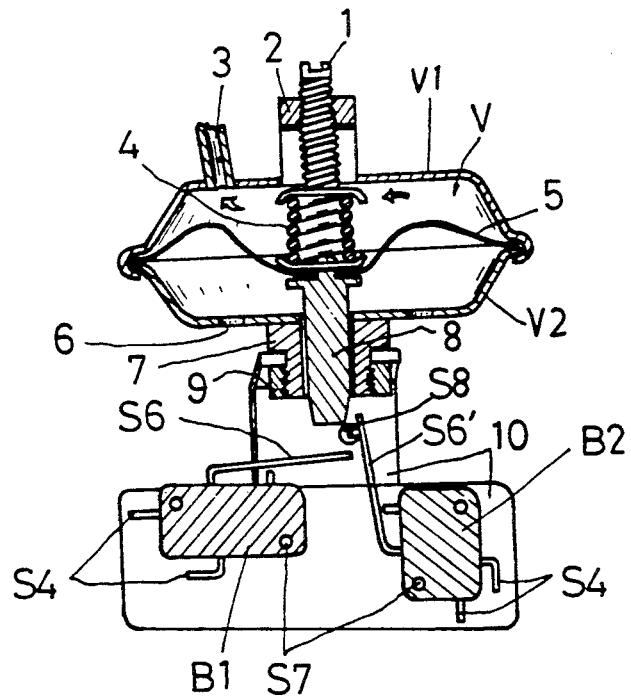
FIG. 7 shows the present invention at slow speed running.

As shown in FIG. 7, the engine situation is the same as that shown in FIG. 3, in which the diaphragm 5 and central spindle 8 is sucked upwardly without touching the lever S6 of the first switch B1. The micro-switch B1 of power source is normally closed so that the compressor of air conditioner will be continuously running. However, the lever S6' of the second switch B2 is not depressed by the spindle 8 and the normally-closed second switch B2 will switch on the brake lamp BL for warning the rear cars.

Figure 8:
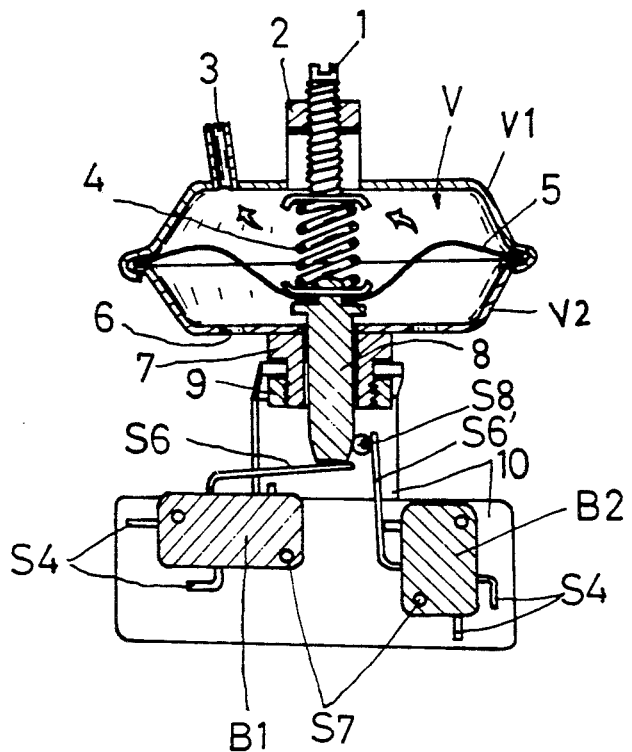
FIG. 8 shows the present invention at normal running speed.

FIG. 8 may be referred to the aforementioned FIG. 4, in which the lever S6 of first switch B1 is not depressed to still maintain the compressor running of the air conditioner; and the lever S6' of the second switch B2 is still depressed to switch off the brake lamp.

Figure 9:
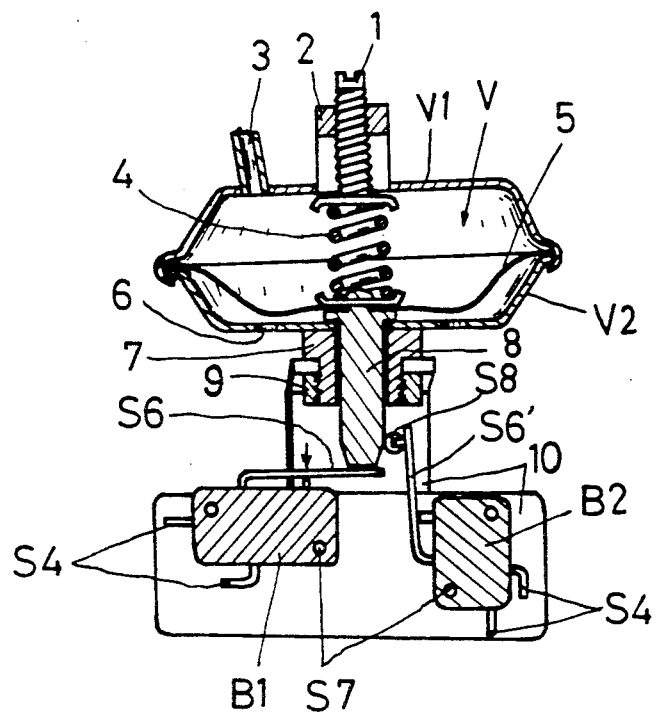
FIG. 9 shows the present invention at high load.

As shown in FIG. 9, the diaphragm 5 and central spindle 8 are restored downwardly to depress the lever S6 of the first switch B1 to switch off the power source to compressor, thereby stopping the running of air conditioner. At this time, the lever S6' of second switch B2 is not depressed to thereby disconnect the power of brake lamp.

The second micro-switch B2 may be modified to be normally opened and operatively depressed by the spindle 8 for switching on another electric device (not shown) used in a car.

The present invention may be modified by those skill in the art without departing from the spirit and scope of the present invention. For instance, the adjusting screw 1 of the vacuum controller may be omitted and the tension of the spring 4 may be pre-designed to match each specific engine. The electric switch may be selected from mechanical type, photo-electric type or other micro-switches either normal open or close.

I claim:

1. A vacuum-controlled switch means responsive to an engine load comprising:

a vacuum controller including a diaphragm formed in a central portion of a controller housing, which is formed by combining a right half disc and a left half disc mounted on a bracket secured in a car body, having the right half disc communicated with an inlet manifold of a car engine, a restoring spring fixed on said right half disc normally urging said diaphragm leftwardly, and a central spindle secured on a central portion of said diaphragm protruding leftwardly through a central hold formed in the left half disc of the controller housing and slidably held in a sleeve securing said left disc on said bracket, said diaphragm and said central spindle being operatively sucked by a vacuum formed in said inlet manifold; and an electrical switch mounted on said bracket adjacent to said central spindle of said vacuum controller, operatively actuated by said central spindle for on-off control of a power source supplied to an electric device built in the car.

2. A vacuum-controlled switch means according to claim 1, wherein said electric device is an electrically-operated clutch of a compressor of a car air conditioner, which is operatively switched on for running the compressor.

3. A vacuum-controlled switch means according to claim 1, wherein said vacuum controller includes an adjusting screw adjustably mounted on said controller housing for adjusting a tension of said restoring spring formed in said vacuum controller.

4. A vacuum-controlled switch means according to claim 1, wherein said electric switch includes a switch spindle slidably held in a switch sleeve adjustably mounted on said bracket, a tensioning spring retained on said switch sleeve normally urging said switch spindle rightwardly to allow a rear conductor plate of said switch spindle electrically contacting two contactors of said electric switch of a power source, said switch spindle being operatively depressed by said central spindle of said vacuum controller movably responsive to a vacuum suction force existing in said inlet manifold of the car engine.

5. A vacuum-controlled switch means according to claim 1, wherein a further photo-electric switch is provided in between said switch spindle of said electric switch and said central spindle of said vacuum controller, which photo-electric switch is operatively actuated by a light beam projecting through a space not shielded by said central spindle when leaving from said switch spindle of said electric switch.

6. A vacuum-controlled switch means according to claim 1, said electric switch is a micro-switch having a resilient actuating lever operatively depressible by said central spindle of said vacuum controller for on-off control thereof.

7. A vacuum-controlled switch means according to claim 6, wherein said resilient actuating lever includes a roller rotatably mounted on an outermost end portion of said lever to be rollingly depressible by a cylindrical surface formed on said central spindle of said vacuum controller.

* * * * *